United States Patent
Kurokawa et al.

(10) Patent No.: US 11,656,527 B2
(45) Date of Patent: May 23, 2023

(54) LIGHT CONTROL DEVICE AND ILLUMINATION DEVICE

(71) Applicant: Japan Display Inc., Tokyo (JP)

(72) Inventors: Tae Kurokawa, Tokyo (JP); Takeo Koito, Tokyo (JP); Masashi Mitsui, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/881,623

(22) Filed: Aug. 5, 2022

(65) Prior Publication Data

US 2022/0373856 A1    Nov. 24, 2022

Related U.S. Application Data

(63) Continuation of application No. PCT/JP2020/047431, filed on Dec. 18, 2020.

(30) Foreign Application Priority Data

Feb. 7, 2020    (JP) .............................. JP2020-019701

(51) Int. Cl.
*G02F 1/29*    (2006.01)
*G02F 1/1337*    (2006.01)
*G02F 1/1343*    (2006.01)

(52) U.S. Cl.
CPC .......... *G02F 1/29* (2013.01); *G02F 1/133738* (2021.01); *G02F 1/133742* (2021.01); *G02F 1/134309* (2013.01); *G02F 2201/122* (2013.01); *G02F 2203/07* (2013.01)

(58) Field of Classification Search
None
See application file for complete search history.

(56) References Cited

U.S. PATENT DOCUMENTS

| 2012/0257131 A1 | 10/2012 | Galstian et al. |
| 2014/0028924 A1* | 1/2014 | Yamaguchi .......... G03B 17/565 349/1 |
| 2016/0077402 A1 | 3/2016 | Takehara et al. |

FOREIGN PATENT DOCUMENTS

| JP | 2008-76926 A | 4/2008 |
| JP | 2013-515969 A | 5/2013 |
| JP | 2016-57541 A | 4/2016 |

OTHER PUBLICATIONS

International Search Report and Written Opinion dated Mar. 2, 2021, received for PCT Application PCT/JP2020/047431, filed on Dec. 18, 2020, 9 pages including English Translation.

* cited by examiner

*Primary Examiner* — Phu Vu

(74) *Attorney, Agent, or Firm* — Xsensus LLP

(57) ABSTRACT

According to one embodiment, a light control device includes a first liquid crystal cell including a first liquid crystal layer, a second liquid crystal cell including a second liquid crystal layer, and a polarization conversion element. The first liquid crystal layer and the second liquid crystal layer each includes a first region which scatters a first polarized component and transmits a second polarized component and a second region which transmits the first polarized component and scatters the second polarized component. The polarization conversion element overlaps the first region and the second region, converts the first polarized component into the second polarized component, and converts the second polarized component into the first polarized component.

10 Claims, 12 Drawing Sheets

LIGHT CONTROL DEVICE AND ILLUMINATION DEVICE

CROSS-REFERENCE TO RELATED APPLICATIONS

This application is a Continuation application of PCT Application No. PCT/JP2020/047431, filed Dec. 18, 2020 and based upon and claiming the benefit of priority from Japanese Patent Application No. 2020-019701, filed Feb. 7, 2020, the entire contents of all of which are incorporated herein by reference.

FIELD

Embodiments described herein relate generally to a light control device and an illumination device.

BACKGROUND

In recent years, a light control device using a liquid crystal cell has been proposed. Such a light control device mainly converges or diverges a polarization component. For example, a liquid crystal lens comprising a plurality of ring electrodes has been proposed. In addition, a liquid crystal lens provided with transparent electrodes arranged in a plurality of fan-shaped divided areas has also been proposed as another example.

In an example of using a light control device using a liquid crystal cell, efficiently scattering incident light is required.

DETAILED DESCRIPTION

Figure 1:
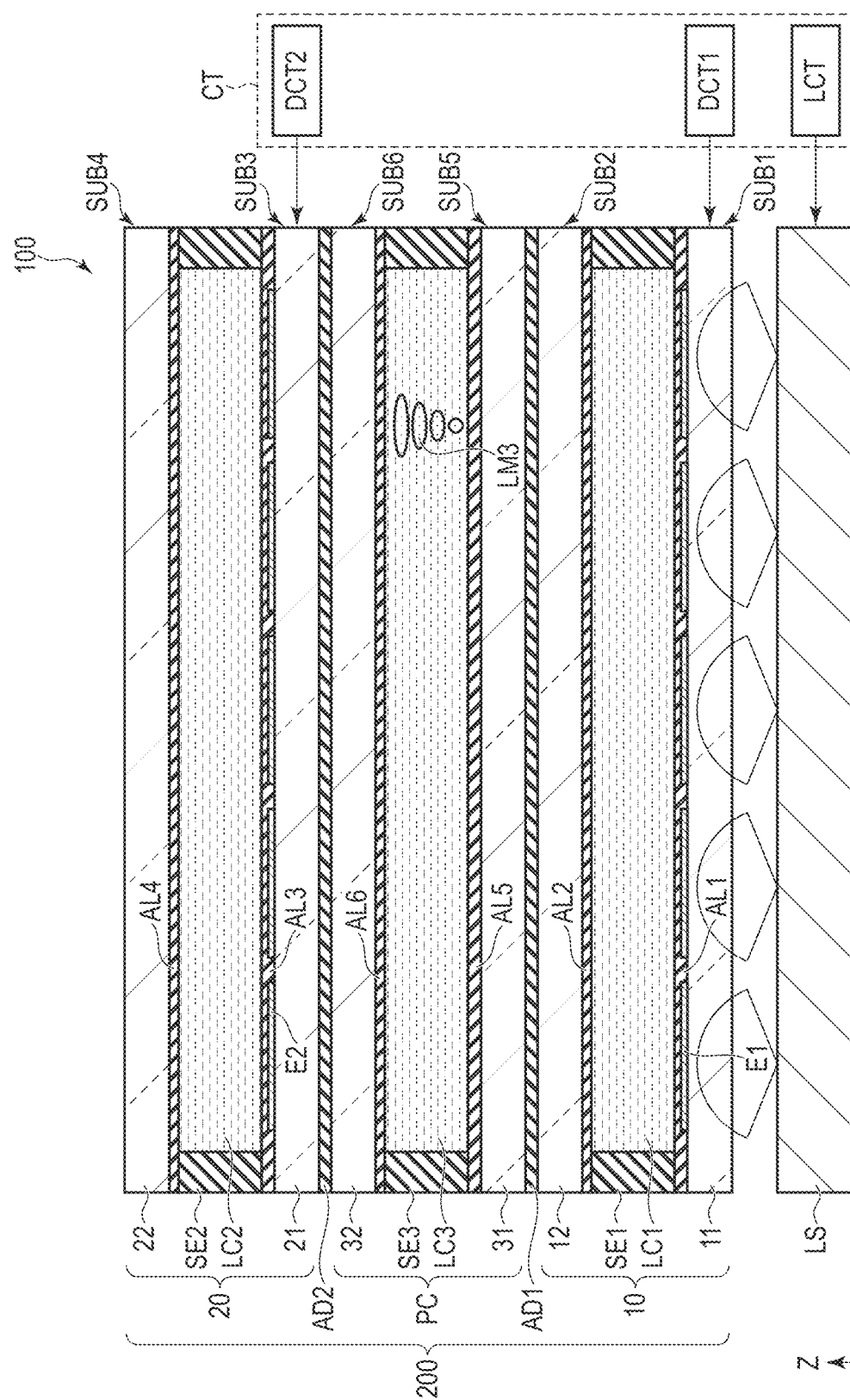
FIG. 1 is a view showing a configuration example of an illumination device 100 of embodiments.

In general, according to one embodiment, a light control device comprises: a first liquid crystal cell comprising a first substrate, a second substrate opposed to the first substrate, and a first liquid crystal layer held between the first substrate and the second substrate, the first substrate comprising a plurality of first electrodes disposed concentrically; a second liquid crystal cell comprising a third substrate, a fourth substrate opposed to the third substrate, and a second liquid crystal layer held between the third substrate and the fourth substrate, the third substrate comprising a plurality of second electrodes disposed concentrically; and a polarization conversion element disposed between the first liquid crystal cell and the second liquid crystal cell. Each of the first liquid crystal layer and the second liquid crystal layer includes: a first area where a first polarization component having a first polarization plane along a first direction, of incident light, is scattered, and a second polarization component having a second polarization plane along a second direction intersecting the first direction, of incident light, is transmitted; and a second area where the first polarization component of the incident light is transmitted and the second polarization component of the incident light is scattered. The polarization conversion element PC overlaps the first area and the second area, and is configured to convert the first polarization component of the incident light into the second polarization component, and to convert the second polarization component of the incident light into the first polarization component.

According to another embodiment, a light control device comprises: a first liquid crystal cell comprising a first substrate comprising a plurality of first electrodes disposed concentrically and a first alignment film covering the plurality of first electrodes, a second substrate comprising a second alignment film, and a first liquid crystal layer held between the first substrate and the second substrate; a second liquid crystal cell comprising a third substrate comprising a plurality of second electrodes disposed concentrically and a third alignment film covering the plurality of second electrodes, a fourth substrate comprising a fourth alignment film, and a second liquid crystal layer held between the third substrate and the fourth substrate; and a polarization conversion element comprising a fifth substrate comprising a fifth alignment film, a sixth substrate comprising a sixth alignment film, and a third liquid crystal layer held between the fifth substrate and the sixth substrate. The first to fourth alignment films are vertical alignment films. The polarization conversion element is disposed between the first liquid crystal cell and the second liquid crystal cell. The fifth alignment film and the sixth alignment film are horizontal alignment films. An alignment treatment directions of the fifth alignment film and an alignment treatment directions of the sixth alignment film intersect each other. The third liquid crystal layer contains twist-aligned liquid crystal molecules.

According to yet another embodiment, a light control device comprises: a first liquid crystal cell comprising a first substrate comprising a plurality of first electrodes disposed concentrically and a first alignment film covering the plurality of first electrodes, a second substrate comprising a second alignment film, and a first liquid crystal layer held between the first substrate and the second substrate; a second liquid crystal cell comprising a third substrate comprising a plurality of second electrodes disposed concentrically and a third alignment film covering the plurality of second electrodes, a fourth substrate comprising a fourth alignment film, and a second liquid crystal layer held between the third substrate and the fourth substrate; and a polarization conversion element comprising a fifth substrate comprising a fifth alignment film, a sixth substrate comprising a sixth alignment film, and a third liquid crystal layer held between the fifth substrate and the sixth substrate. The first alignment film and the third alignment film are horizontal alignment films. An alignment treatment directions of the first alignment film and an alignment treatment directions of the third alignment film are parallel to each other. The second alignment film and the fourth alignment film are vertical alignment films. The polarization conversion element is disposed between the first liquid crystal cell and the second liquid crystal cell. The fifth alignment film and the sixth alignment film are horizontal alignment films. An alignment treatment directions of the fifth alignment film and an alignment treatment directions of the sixth alignment film intersect each other. The third liquid crystal layer contains twist-aligned liquid crystal molecules.

According to yet another embodiment, a light control device comprises: a first liquid crystal cell comprising a first substrate comprising a plurality of first electrodes disposed concentrically and a first alignment film covering the plurality of first electrodes, a second substrate comprising a plurality of third electrodes disposed concentrically and a second alignment film covering the plurality of third electrodes, and a first liquid crystal layer held between the first substrate and the second substrate; a second liquid crystal cell comprising a third substrate comprising a plurality of second electrodes disposed concentrically and a third alignment film covering the plurality of second electrodes, a fourth substrate comprising a plurality of fourth electrodes disposed concentrically and a fourth alignment film covering the plurality of fourth electrodes, and a second liquid crystal layer held between the third substrate and the fourth substrate; and a polarization conversion element comprising a fifth substrate comprising a fifth alignment film, a sixth substrate comprising a sixth alignment film, and a third liquid crystal layer held between the fifth substrate and the sixth substrate. A center of the first electrode, a center of the second electrode, a center of the third electrode, and a center of the fourth electrode overlap in planar view. The polarization conversion element is disposed between the first liquid crystal cell and the second liquid crystal cell. The fifth alignment film and the sixth alignment film are horizontal alignment films. An alignment treatment directions of the fifth alignment film and an alignment treatment directions of the sixth alignment film intersect each other. The third liquid crystal layer contains twist-aligned liquid crystal molecules.

According to one embodiment, an illumination device comprises: a light source; and one of the above light control device configured to control light emitted from the light source.

According to the embodiments, a light control device and an illumination device capable of improving a scattering efficiency can be provided.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a view showing a configuration example of an illumination device 100 of embodiments. For example, a first direction X, a second direction Y, and a third direction Z are orthogonal to each other but may intersect at an angle other than 90 degrees. The first direction X and the second direction Y correspond to, for example, directions parallel to a substrate included in the illumination device 100, and the third direction Z corresponds to a thickness direction of the illumination device 100. In the embodiments, viewing an X-Y plane defined by the first direction X and the second direction Y is referred to as planar view.

The illumination device 100 comprises a light source LS, a light control device 200 configured to control light emitted from the light source LS, and a controller CT. The light source LS emits light in the third direction Z. The light emitted from the light source LS is, for example, non-polarized light (natural light). The light control device 200 overlaps the light source LS in the third direction Z. The light control device 200 comprises a first liquid crystal cell 10, a second liquid crystal cell 20, and a polarization conversion element PC. The first liquid crystal cell 10 and the second liquid crystal cell 20 include substantially the same components, but may include different components. The polarization conversion element PC is disposed between the first liquid crystal cell 10 and the second liquid crystal cell 20.

The first liquid crystal cell 10 comprises a first substrate SUB1, a second substrate SUB2, and a first liquid crystal layer LC1. The first substrate SUB1 comprises an insulating substrate 11, a plurality of first electrodes E1 disposed on the insulating substrate 11, and a first alignment film AL1 covering the first electrodes E1. The light source LS is disposed to be opposed to the insulating substrate 11 in the third direction Z. The second substrate SUB2 comprises an insulating substrate 12 and a second alignment film AL2 covering the insulating substrate 12. The second substrate SUB2 may comprise a common electrode opposed to the plurality of first electrodes E1 via the first liquid crystal layer LC1. The first liquid crystal layer LC1 is held between the first substrate SUB1 and the second substrate SUB2 and is in contact with the first alignment film AL1 and the second alignment film AL2. The first liquid crystal layer LC1 is sealed by a sealant SE1.

The second liquid crystal cell 20 comprises a third substrate SUB3, a fourth substrate SUB4, and a second liquid crystal layer LC2. The third substrate SUB3 comprises an insulating substrate 21, a plurality of second electrodes E2 disposed on the insulating substrate 21, and a third alignment film AL3 covering the second electrodes E2. The second electrodes E2 are formed to overlap the first electrodes E1 in the third direction Z. The fourth substrate SUB4 comprises an insulating substrate 22 and a fourth alignment film AL4 covering the insulating substrate 22. The fourth substrate SUB4 may comprise a common electrode opposed to the plurality of second electrodes E2 via the second liquid crystal layer LC2. The second liquid crystal layer LC2 is held between the third substrate SUB3 and the fourth substrate SUB4 and is in contact with the third alignment film AL3 and the fourth alignment film AL4. The second liquid crystal layer LC2 is sealed by a sealant SE2. In the second liquid crystal cell 20, the third substrate SUB3 includes the same components as those of the first substrate SUB1, the fourth substrate SUB4 includes the same components as those of the second substrate SUB2, and the configuration of the second liquid crystal layer LC2 is the same as the configuration of the first liquid crystal layer LC1.

The polarization conversion element PC comprises a fifth substrate SUB5, a sixth substrate SUB6, and the third liquid crystal layer LC3. The fifth substrate SUB5 comprises an insulating substrate 31, and a fifth alignment film AL5 covering the insulating substrate 31. The sixth substrate SUB6 comprises an insulating substrate 32 and a sixth alignment film AL6 covering the insulating substrate 32. The third liquid crystal layer LC3 is held between the fifth substrate SUB5 and the sixth substrate SUB6, and is in contact with the fifth alignment film AL5 and the sixth alignment film AL6. The third liquid crystal layer LC3 is sealed by a sealant SE3. The fifth alignment film AL5 and the sixth alignment film AL6 are, for example, horizontal alignment films having an alignment restriction force substantially parallel to the X-Y plane and are subjected to alignment treatment in a predetermined direction. The alignment treatment may be a rubbing treatment or an optical alignment treatment. An alignment treatment direction of the fifth alignment film AL5 intersects an alignment treatment direction of the sixth alignment film AL6. The third liquid crystal layer LC3 contains liquid crystal molecules LM3 twist-aligned between the fifth alignment film AL5 and the sixth alignment film AL6. The polarization conversion element PC does not comprise electrodes such as the first liquid crystal cell 10 and the second liquid crystal cell 20. Therefore, an electric field is not formed in the third liquid crystal layer LC3, and the aligned state of the liquid crystal molecules LM3 is maintained by alignment restriction forces of the fifth alignment film AL5 and the sixth alignment film AL6.

The insulating substrates 11 and 12, the insulating substrates 21 and 22, and the insulating substrates 31 and 32 are, for example, transparent substrates such as glass substrates and resin substrates.

The first electrodes E1 and the second electrodes E2 are transparent electrodes formed of a transparent conductive material such as indium tin oxide (ITO) or indium zinc oxide (IZO).

The configuration examples of the first alignment film AL1, the second alignment film AL2, the third alignment film AL3, and the fourth alignment film AL4 will be described later.

The polarization conversion element PC overlaps the first liquid crystal cell 10 in the third direction Z. The insulating substrate 12 and the insulating substrate 31 are bonded to each other by a transparent adhesive layer AD1. A refractive index of the adhesive layer AD1 is equal to the refractive index of the insulating substrates 12 and 31.

The second liquid crystal cell 20 overlaps the polarization conversion element PC in the third direction Z. The insulating substrate 32 and the insulating substrate 21 are bonded to each other by a transparent adhesive layer AD2. A refractive index of the adhesive layer AD2 is equal to the refractive index of the insulating substrates 32 and 21.

The controller CT comprises a light source controller LCT, and voltage controllers DCT1 and DCT2. The light source controller LCT controls, for example, a current value for driving the light source LS. The voltage controller DCT1 controls a voltage to be applied to each of the first electrodes E1 in the first liquid crystal cell 10. The voltage controller DCT2 controls a voltage to be applied to each of the second electrodes E2 in the second liquid crystal cell 20.

Figure 2:
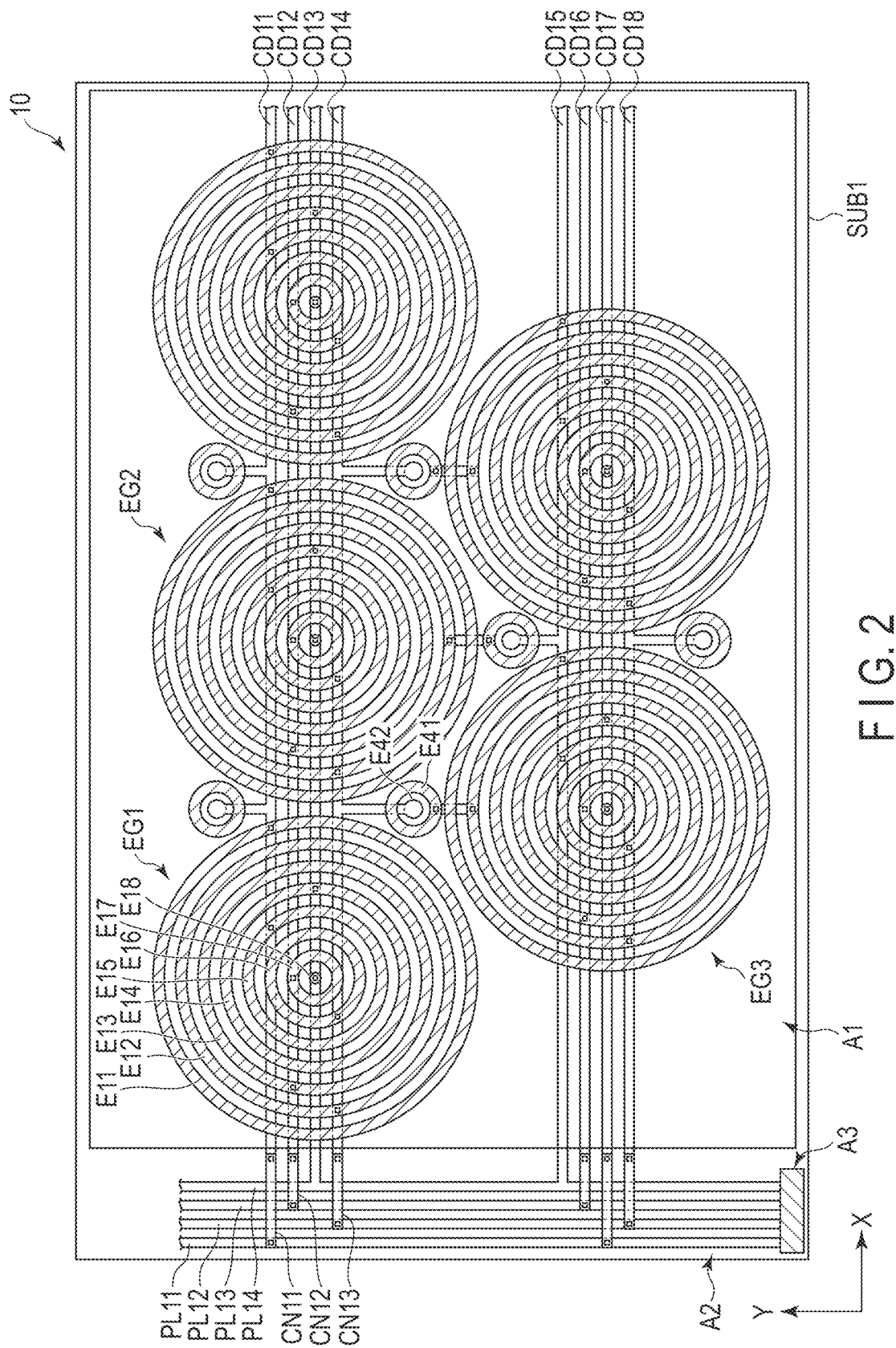
FIG. 2 is a plan view showing a configuration example of a first liquid crystal cell 10.

FIG. 2 is a plan view showing a configuration example of a first liquid crystal cell 10. Only main parts of the first liquid crystal cell 10 are illustrated in FIG. 2.

The first substrate SUB1 of the first liquid crystal cell 10 comprises a plurality of power supply lines PL11 to PL14, a plurality of conductive lines CD11 to CD18, and a plurality of electrode groups EG1 to EG3. The power supply lines PL11 to PL14 and the conductive lines CD11 to CD18 are disposed in the same layer. An insulating film to be described later is interposed between the conductive lines CD11 to CD18 and the electrode groups EG1 to EG3. In FIG. 2, squares at positions where the two conductive layers overlap indicate connection portions where the conductive layer located under the insulating film and the conductive layer located above the insulating film are electrically connected to each other through contact holes penetrating the insulating film.

The power supply lines PL11 to PL14 are arranged in the first direction X in a peripheral area A2. Each of these power supply lines PL11 to PL14 extends to a terminal portion A3. Although not described in detail, the terminal portion A3 comprises a plurality of terminals connected to the respective power supply lines PL11 to PL14, and is electrically connected to a flexible wiring board or the like.

The conductive lines CD11 to CD18 extend along the first direction X and are arranged in the second direction Y, in an effective area A1. In addition, the conductive lines CD11 to CD18 extend to the peripheral area A2 and are electrically connected to any of the power supply lines PL11 to PL14. For example, the conductive line CD13 is formed integrally with the power supply line PL14. In addition, the conductive line CD11 is electrically connected to the power supply line PL11 via the connection line CN11. Similarly, the conductive line CD12 is connected to the power supply line PL13 via the connecting line CN12, and the conductive line CD14 is connected to the power supply line PL12 via the connection line CN13. These connection lines CN11 to CN13 are conductive layers disposed in the same layer as the electrode groups EG1 to EG3.

Each of the electrode groups EG1 to EG3 is composed of a plurality of first electrodes E1 formed concentrically. For example, the electrode group EG1 is composed of eight first electrodes E11 to E18. All the first electrodes E11 to E17 are formed in an annular shape and have the same width. In addition, the first electrode E18 located substantially at the center of the electrode group EG1 is formed in a circular shape. The first electrodes E11 to E17 are arranged toward the first electrode E18 at substantially equal pitches in the radial direction.

The conductive lines CD11 to CD14 intersect the first electrodes E11 to E18. The first electrodes E11 and E15 are electrically connected to the conductive line CD11. The first electrodes E12 and E16 are electrically connected to the conductive line CD14. The first electrodes E13 and E17 are electrically connected to the conductive line CD12. The first electrodes E14 and E18 are electrically connected to the conductive line CD13.

The electrode groups EG2 and EG3 are configured similarly to the electrode group EG1.

The number of first electrodes constituting each electrode group is not limited to the illustrated example.

These electrode groups EG1 to EG3 are disposed to form a close-packed structure in the X-Y plane.

The electrode E41 is located on an inner side surrounded by the electrode groups EG1 to EG3. In other words, the electrode E41 is disposed in a gap between the electrode groups EG1 to EG3 disposed to form the close-packed structure. The electrode E41 is formed in an annular shape smaller than that of the first electrode E11. A potential of the electrode E41 is set to be different from potentials of the adjacent electrodes.

The electrode E42 is located inside the electrode E41 and is electrically connected to the conductive line CD14. A potential of the electrode E42 is set to be different from a potential of the electrode E41.

Figure 3:
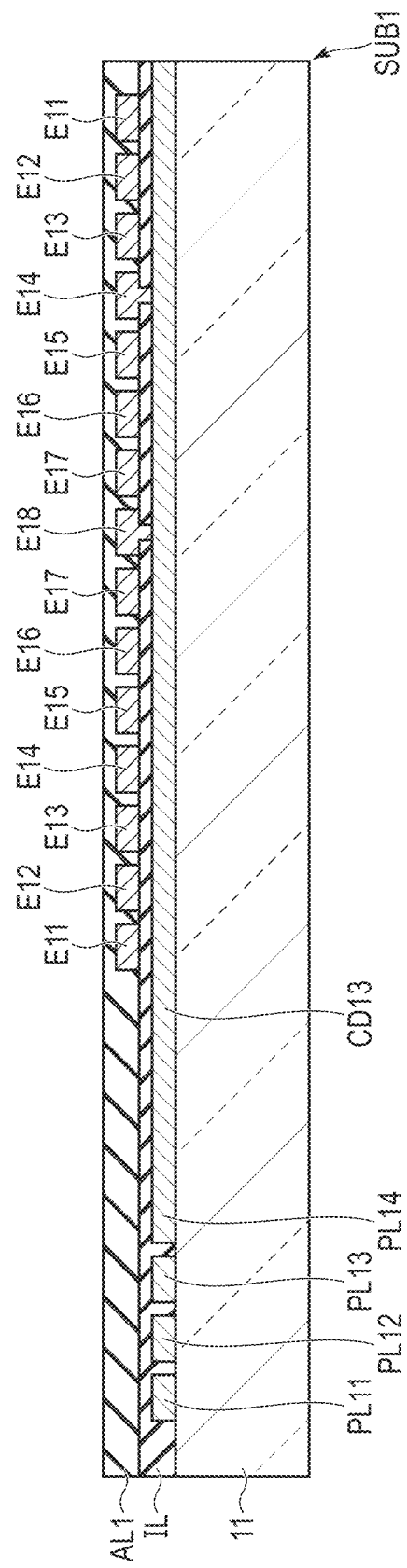
FIG. 3 is a cross-sectional view showing a first substrate SUB1 shown in FIG. 2 along the conductive line CD13.

FIG. 3 is a cross-sectional view showing a first substrate SUB1 shown in FIG. 2 along the conductive line CD13. The power supply lines PL11 to PL14 and the conductive line CD13 are disposed on the insulating substrate 11 and covered with the insulating film IL. The first electrodes E11 to E18 are disposed on the insulating film IL and covered with the first alignment film AL1. In the illustrated example, the conductive line CD13 is directly connected to the power supply line PL14. In addition, the first electrodes E14 and E18 are connected to the conductive line CD13 through contact holes penetrating the insulating film IL.

The power supply lines PL11 to PL14 are formed of, for example, a metal material. As described above, the first electrodes E11 to E18 are formed of a transparent conductive material. The conductive line CD13 is formed of, for example, a transparent conductive material, but may be formed of a metal material.

The configuration example of the first liquid crystal cell 10 has been described with reference to FIG. 2 and FIG. 3, and the third substrate SUB3 of the second liquid crystal cell 20 is also constituted similarly to the first substrate SUB1.

Figure 4:
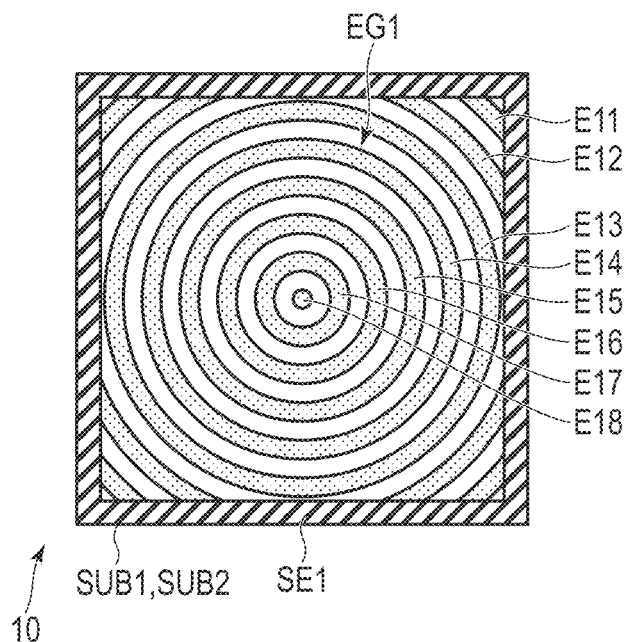
FIG. 4 is a plan view showing another configuration example of the first liquid crystal cell 10.

FIG. 4 is a plan view showing another configuration example of the first liquid crystal cell 10. The configuration example shown in FIG. 4 is different from the configuration example shown in FIG. 2 in that the first substrate SUB1 having a rectangular shape comprises one electrode group EG1. The first substrate SUB1 and the second substrate SUB2 are bonded to each other by a rectangular frame-shaped sealant SE1. The first substrate SUB1 comprises a plurality of first electrodes E11 to E18 constituting the electrode group EG1. In the illustrated example, the first electrodes E11 and E12 located near corners of the first substrate SUB1 are formed in an arc shape, the first electrodes E13 to E11 are formed in an annular shape, and the first electrode E18 is formed in a circular shape.

Figure 5:
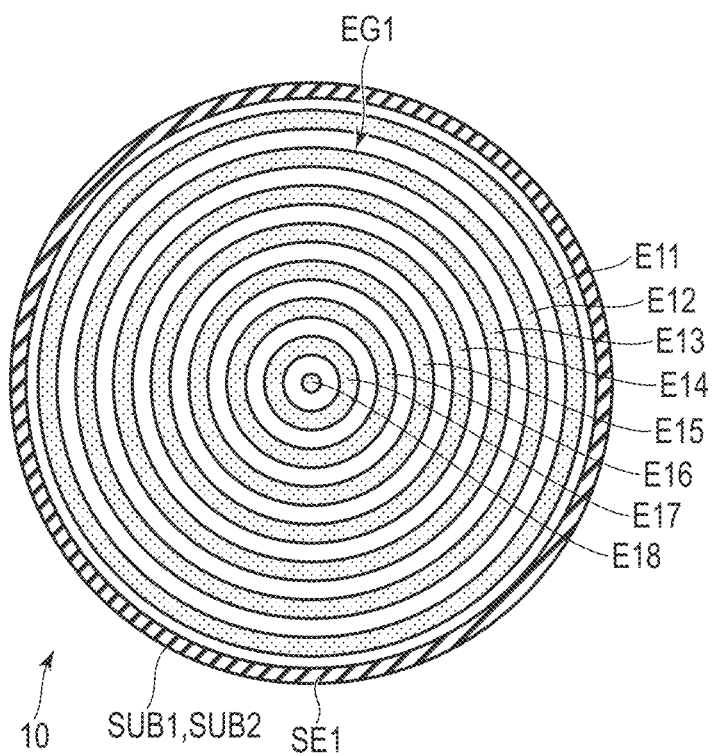
FIG. 5 is a plan view showing yet another configuration example of the first liquid crystal cell 10.

FIG. 5 is a plan view showing yet another configuration example of the first liquid crystal cell 10. The configuration example shown in FIG. 5 is different from the configuration example shown in FIG. 2 in that the first substrate SUB1 having a circular shape comprises one electrode group EG1. The first substrate SUB1 comprises a plurality of first electrodes E11 to E18 constituting the electrode group EG1. In the illustrated example, the first electrodes E11 to E11 are formed in an annular shape, and the first electrode E18 is formed in a circular shape.

Figure 6:
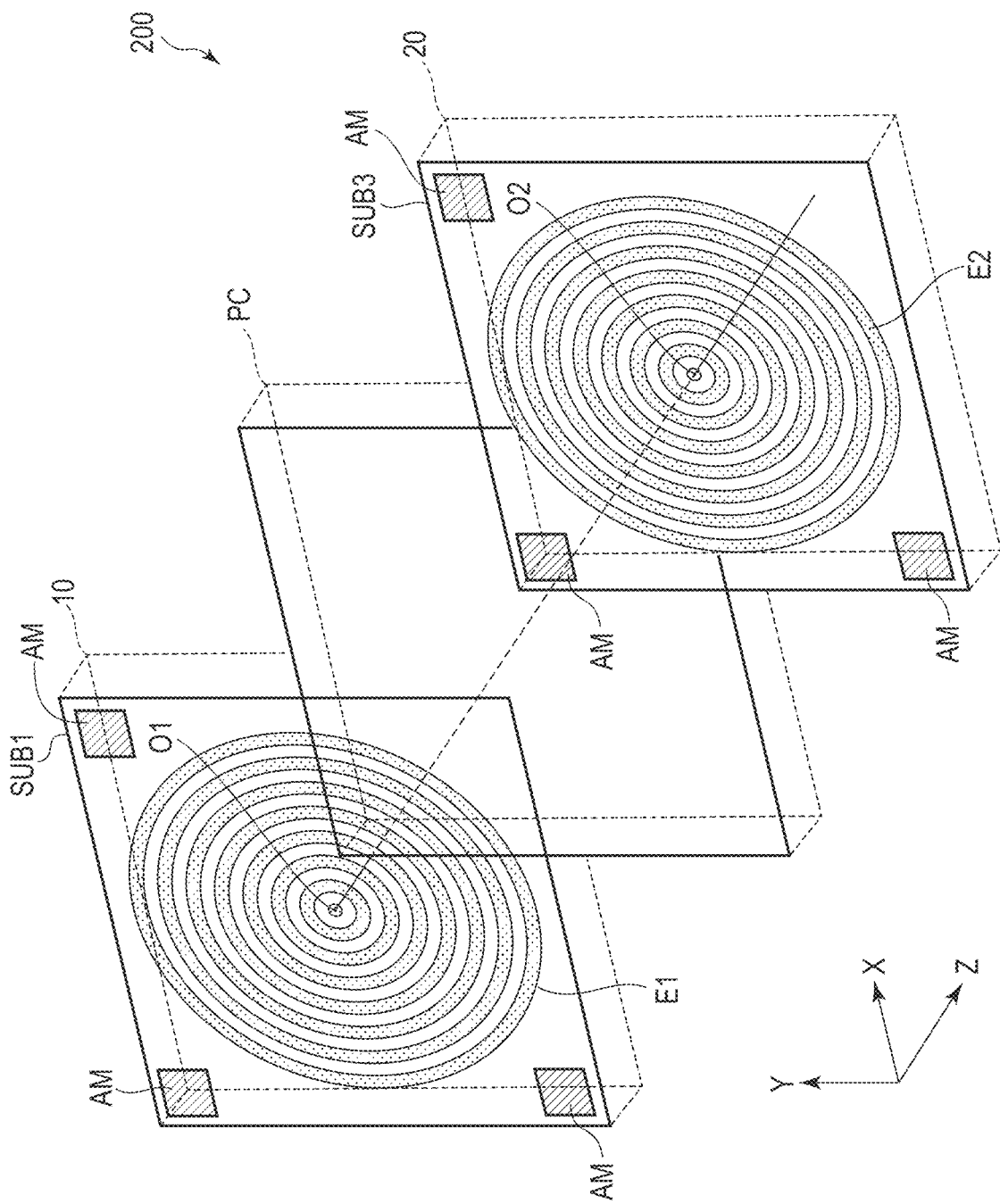
FIG. 6 is an exploded perspective view showing the light control device 200.

FIG. 6 is an exploded perspective view showing the light control device 200. In FIG. 6, only main parts are illustrated.

The first liquid crystal cell 10 comprises a plurality of first electrodes E1 disposed concentrically, and the second liquid crystal cell 20 comprises a plurality of second electrodes E2 disposed concentrically. For example, each of the first electrodes E1 and the second electrodes E2 is equal in the diameter, the width, the pitch, and the number of electrodes. In addition, a center O1 of the first electrodes E1 and a center O2 of the second electrodes E2 overlap in planar view of the X-Y plane. In other words, the first electrodes E1 and the second electrodes E2 are formed such that their centers correspond to each other in the X-Y plane.

The first substrate SUB1 comprising the first electrodes E1 and the third substrate SUB3 comprising the second electrode E2, are, for example, cut out from the same mother-substrate and are formed under the same specifications. Each of these first substrate SUB1 and the third substrate SUB3 comprises alignment marks AM. The first substrate SUB1 and the third substrate SUB3 are positioned based on their respective alignment marks AM and are disposed such that the first electrodes E1 and the second electrodes E2 overlap.

First Configuration Example

FIG. 7 is a view illustrating a configuration example of the first liquid crystal cell 10. Only the configuration necessary for description is illustrated in FIG. 7. The first alignment film AL1 and the second alignment film AL2 are vertical alignment films having alignment restriction forces along the normal of the first liquid crystal cell 10. The first liquid crystal layer LC1 is, for example, a negative type with a negative dielectric anisotropy and contains liquid crystal molecules LM1. The first liquid crystal layer LC1 may be a positive type with a positive dielectric anisotropy.

Figure 7B:
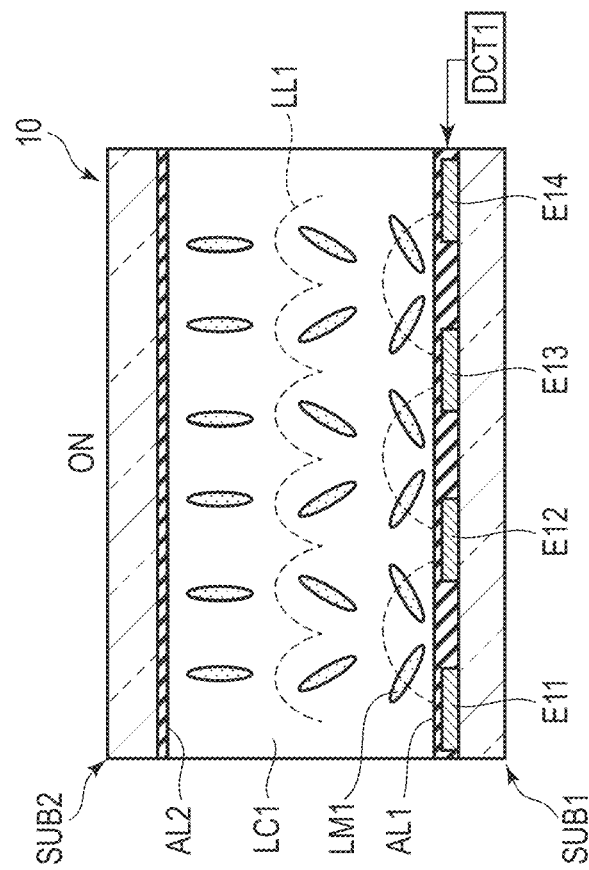
FIG. 7B is a view illustrating a configuration example of the first liquid crystal cell 10.
Figure 7A:
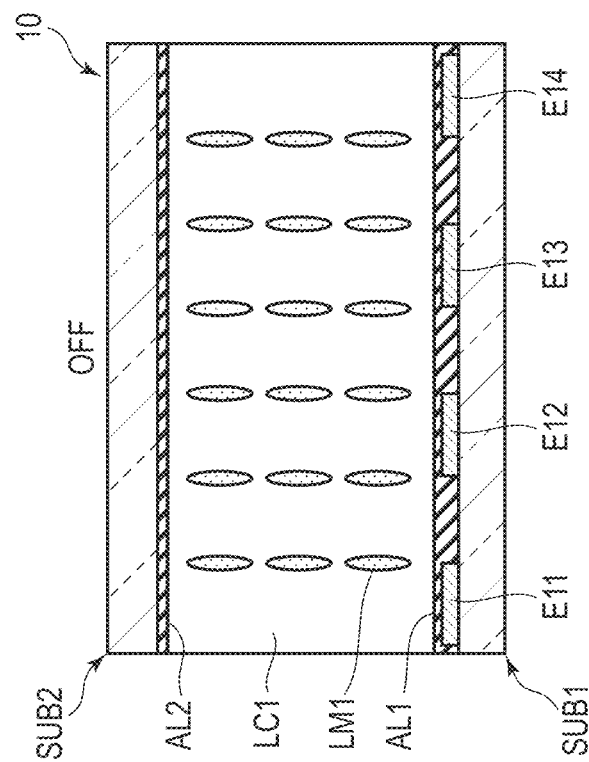
FIG. 7A is a view illustrating a configuration example of the first liquid crystal cell 10.

FIG. 7A shows an off-state (OFF) in which no voltage is applied to the first electrodes E11 to E14. In other words, no potential difference is formed between the adjacent first electrodes. The liquid crystal molecules LM1 contained in the first liquid crystal layer LC1 are vertically aligned due to the alignment restriction forces of the first alignment film AL1 and the second alignment film AL2.

FIG. 7B shows an on-state (ON) in which a voltage is applied to the first electrodes E11 to E14. The voltage controller DCT1 supplies a predetermined voltage to each of the first electrodes E11 to E14 such that a potential difference is formed between the adjacent first electrodes. Electric fields substantially parallel to the main surface (X-Y plane) of the first substrate SUB1 are formed between the first electrodes E11 and E12, between the first electrodes E12 and E13, and between the first electrodes E13 and E14. Since the first liquid crystal layer LC1 is a negative type, the liquid crystal molecules LM1 is aligned such that their long axes intersect the electric fields in a state in which the electric fields represented by dotted lines in the figure are formed. The first liquid crystal layer LC1 has a thickness of several tens of μm to several hundreds of μm and, when a voltage is applied to the first electrodes E11 to E14, an electric field is formed in the vicinity of the first substrate SUB1 but an electric field hardly reaches the vicinity of the second substrate SUB2. For this reason, the liquid crystal molecules LM1 located in the vicinity of the first substrate SUB1 are aligned under the influence of the electric fields, but the liquid crystal molecules LM1 located in the vicinity of the second substrate SUB2 are maintained in the aligned state similar to the off-state. When the first liquid crystal layer LC1 is a positive type, the liquid crystal molecules LM1 are aligned such that their long axes are arranged along the electric fields.

The liquid crystal molecules LM1 have a refractive anisotropy Δn. For this reason, the liquid crystal layer LC1 in the on-state has a refractive index distribution according to the aligned state of the liquid crystal molecules LM1. Alternatively, the liquid crystal layer LC1 has a retardation distribution represented by Δnd where d refers to a thickness of the first liquid crystal layer LC1 along the third direction Z. Such a refractive index distribution or a retardation distribution forms a liquid crystal lens LL1. In other words, the liquid crystal lens LL1 described here corresponds to a refractive index distribution type lens formed in the first liquid crystal layer LC1. The first liquid crystal cell 10 in which the liquid crystal lens LL1 is formed generates an optical action of scattering the incident light by refracting (converging and diverging) the incident light. The degree of scattering (modulation rate) is controlled based on a voltage applied to the first liquid crystal layer LC1. In other words, the modulation rate in the first liquid crystal cell 10 is controlled by the voltage controller DCT1.

The first liquid crystal cell 10 has been described, and the second liquid crystal cell 20 includes the same components as those of the first liquid crystal cell 10 as described above. In other words, the third alignment film AL3 and the fourth alignment film AL4 are vertical alignment films, and the second liquid crystal layer LC2 is a negative type. In the second liquid crystal cell 20, too, a liquid crystal lens similar to the liquid crystal lens LL1 described with reference to FIG. 7B can be formed in the on-state. The modulation rate in the second liquid crystal cell 20 is controlled by the voltage controller DCT2. The voltage controller DCT1 and the voltage controller DCT2 may be controlled under the same voltage conditions or may be controlled under different voltage conditions.

Figure 8:
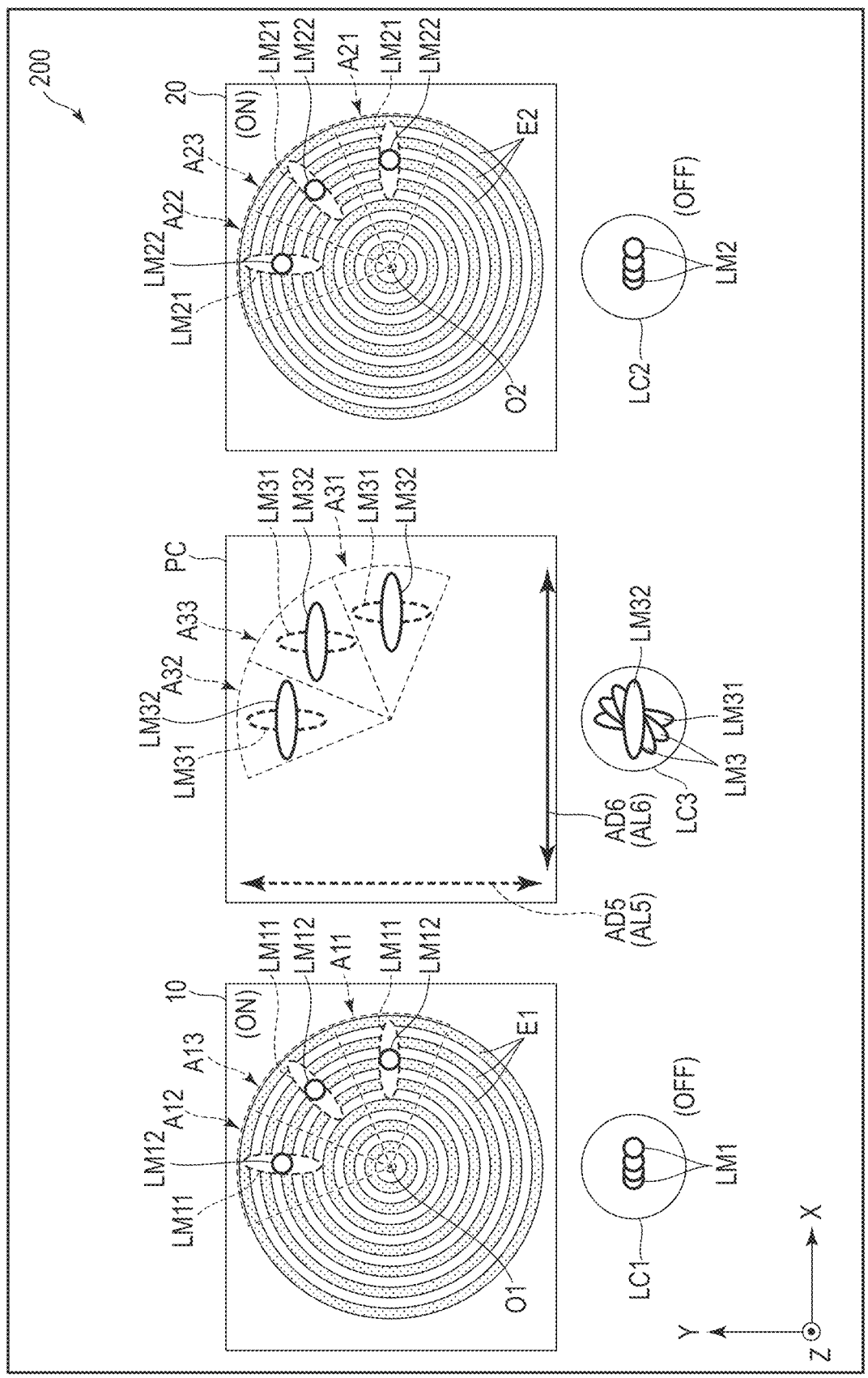
FIG. 8 is a view showing a first configuration example of the light control device 200.

FIG. 8 is a view showing a first configuration example of the light control device 200. FIG. 8 shows an aligned state of the liquid crystal molecules in the on-state (ON) in which a voltage is applied to each of the first liquid crystal cell 10 and the second liquid crystal cell 20, and an aligned state of the liquid crystal molecules in the off-state (OFF) in which no voltage is applied to a lower stage of each of the liquid crystal cells.

As shown in FIG. 7A, the first alignment film AL1 and the second alignment film AL2 are vertical alignment films, in the first liquid crystal cell 10. The liquid crystal molecules LM1 of the first liquid crystal layer LC1 are vertically aligned between the first alignment film AL1 and the second alignment film AL2, in the off-state.

In addition, the third alignment film AL3 and the fourth alignment film AL4 are vertical alignment films in the second liquid crystal cell 20, similarly to the first liquid crystal cell 10 shown in FIG. 7A. The liquid crystal molecules LM2 of the second liquid crystal layer LC2 are vertically aligned between the third alignment film AL3 and the fourth alignment film AL4, in the off-state.

In the polarization conversion element PC, an alignment treatment direction AD5 of the fifth alignment film AL5 is parallel to the second direction Y, and an alignment treatment direction AD6 of the sixth alignment film AL6 is parallel to the first direction X. In other words, the alignment treatment direction AD5 is orthogonal to the alignment treatment direction AD6, in the polarization conversion element PC. The third liquid crystal layer LC3 is a positive type with a positive dielectric anisotropy and contains liquid crystal molecules LM3. In the off-state, the liquid crystal molecules LM3 are twist-aligned at 90 degrees between the fifth alignment film AL5 and the sixth alignment film AL6. Among the liquid crystal molecules LM3, a liquid crystal molecule LM31 near the fifth alignment film AL5 is aligned along the second direction Y, a liquid crystal molecule LM32 near the sixth alignment film AL6 is aligned along the first direction X, and the plurality of liquid crystal molecules LM3 located in the intermediate layer are twist-aligned.

In the embodiments, the polarization conversion element PC has an optical rotation ability to rotate a polarization plane of a polarization component (linearly polarized light) of the incident light at 90 degrees. For example, the polarization conversion element PC converts the first polarization component of the incident light into the second polarization component, and converts the second polarization component of the incident light into the first polarization component. The polarization plane of the first polarization component is orthogonal to the polarization plane of the second polarization component. When a traveling direction of light is along the third direction Z, the polarization component having the polarization plane along the first direction X is referred to as first polarized light (P-polarized light) POL1, and the polarization component having the polarization plane along the second direction Y is referred to as second polarized light (S-polarized light) POL2. For example, the first polarization component is the first polarized light POL1, and the second polarization component is the second polarized light POL2.

The optical action of each liquid crystal cell will be described below.

The first liquid crystal cell 10 includes an area (first area) A11 extending from the center O1 of the first electrode E1 in the first direction X, an area (second area) A12 extending from the center O1 in the second direction Y, and an area A13 between the areas A11 and A12. In each of the areas A11 to A13, the liquid crystal molecules LM1 in the off-state are all vertically aligned similarly.

In the on-state, the liquid crystal molecule LM11 near the first alignment film AL1 is represented by a dotted line in the figure, and the liquid crystal molecule LM12 near the second alignment film AL2 is represented by a solid line in the figure. In the on-state, an electric field between adjacent first electrodes E1 is formed along the radial direction of the first electrodes E1, in each of the areas A11 to A13.

In the area A11, the liquid crystal molecule LM11 is aligned in the first direction X under an influence from the electric field. The liquid crystal molecule LM12 is hardly influenced by the electric field and is maintained in a vertically aligned state. In the area A11, the optical action occurs due to the refractive index distribution formed by the electric field. In such an area A11, the first polarization component (P-polarized light) of the incident light is scattered by the optical action. In addition, in the area A11, the second polarization component (S-polarized light) of the incident light is hardly scattered and is transmitted.

In the area A12, the liquid crystal molecule LM11 is aligned in the second direction Y under an influence from the electric field. The liquid crystal molecule LM12 is hardly influenced by the electric field and is maintained in a vertically aligned state. In the area A12, the optical action occurs due to the refractive index distribution formed by the electric field. In the area A12, the first polarization component of the incident light is hardly scattered and is transmitted. In addition, in the area A12, the second polarization component of the incident light is scattered by the optical action.

In the area A13, the liquid crystal molecule LM11 is aligned under an influence from the electric field, and the liquid crystal molecule LM12 is maintained in a vertically aligned state. In other words, in the on-state, the liquid crystal molecule LM11 of the first liquid crystal layer LC1 overlapping the first electrodes E1 is aligned radially from the center O1.

The polarization conversion element PC overlaps the areas A11 to A13. In other words, the polarization conversion element PC includes an area (third area) A31 overlapping the area A11, an area (fourth area) A32 overlapping the area A12, and an area A33 overlapping the area A13. In other words, the transmitted light of the area A11 becomes the incident light to the area A31, the transmitted light of the area A12 becomes the incident light to the area A32, and the transmitted light of the area A13 becomes the incident light to the area A33.

In each of the areas A31 to A33, the liquid crystal molecules LM3 are all twist-aligned similarly. The liquid crystal molecule LM21 is represented by a dotted line in the figure, and the liquid crystal molecule LM22 in the on-state is represented by a solid line in the figure.

In the area A31, a polarization plane of the second polarization component of the incident light which is the transmitted light of the area A11 is rotated at 90 degrees to convert into the first polarization component. In addition, in the area A31, the first polarization component scattered in the area A11 is converted into the second polarization component.

In the area A32, a polarization plane of the first polarization component of the incident light which is the transmitted light of the area A12 is rotated at 90 degrees to convert into the second polarization component. In addition, in the area A32, the second polarization component scattered in the area A12 is converted into the first polarization component.

In the area A33, too, the first polarization component of the incident light which is the transmitted light of the area A13 is converted into the second polarization component, and the second polarization component is converted into the first polarization component.

The second liquid crystal cell 20 includes an area A21 extending from the center O2 of the second electrodes E2 in the first direction X, an area A22 extending from the center O2 in the second direction Y, and an area A23 between the areas A21 and A22. The area A21 overlaps the area A31, the area A22 overlaps the area A32, and the area A23 overlaps the area A33. In other words, the transmitted light of the area A31 becomes the incident light to the area A21, the transmitted light of the area A32 becomes the incident light to the area A22, and the transmitted light of the area A33 becomes the incident light to the area A23.

In each of the areas A21 to A23, the liquid crystal molecules LM2 in the off-state are all vertically aligned similarly.

In the on-state, the liquid crystal molecule LM21 near the third alignment film AL3 is represented by a dotted line in the figure, and the liquid crystal molecule LM22 near the fourth alignment film AL4 is represented by a solid line in the figure. In the on-state, an electric field between adjacent second electrodes E2 is formed along the radial direction of the second electrodes E2, in each of the areas A21 to A23.

In the area A21, the liquid crystal molecule LM21 is aligned in the first direction X under an influence from the electric field. The liquid crystal molecule LM22 is hardly influenced by the electric field and is maintained in a vertically aligned state. In the area A21, the optical action occurs due to the refractive index distribution formed by the electric field. In such an area A21, the first polarization component of the incident light which is the transmitted light of the area A31, is scattered by the optical action. In addition, in the area A21, the second polarization component of the incident light is hardly scattered and is transmitted.

In the area A22, the liquid crystal molecule LM21 is aligned in the second direction Y under an influence from the electric field. The liquid crystal molecule LM22 is hardly influenced by the electric field and is maintained in a vertically aligned state. In the area A22, the optical action occurs due to the refractive index distribution formed by the electric field. In such an area A22, the first polarization component of the incident light which is the transmitted light of the area A32, is hardly scattered and is transmitted.

In addition, in the area A22, the second polarization component of the incident light is scattered by the optical action.

In the area A23, the liquid crystal molecule LM21 is aligned under an influence from the electric field, and the liquid crystal molecule LM22 is maintained in a vertically aligned state. In other words, in the on-state, the liquid crystal molecule LM2l of the second liquid crystal layer LC2 overlapping the second electrodes E2 is aligned radially from the center O2.

As described above, according to the first configuration example, the first polarization component of the incident light to the area A11 of the first liquid crystal cell 10 is scattered, but the second polarization component is hardly scattered. The second polarization component transmitted through the area A11 is converted into the first polarization component in the area A31 of the polarization conversion element PC, and is then scattered in the area A21 of the second liquid crystal cell 20. Therefore, both the first polarization component and the second polarization component of the light sequentially transmitted through the area A11, the area A31, and the area A21 of the light control device 200 are scattered.

In addition, the second polarization component of the incident light to the area A12 is scattered, but the first polarization component is hardly scattered. The first polarization component transmitted through the area A12 is converted into the second polarization component in the area A32, and is then scattered in the area A22. Therefore, both the first polarization component and the second polarization component of the light sequentially transmitted through the area A12, the area A32, and the area A22 of the light control device 200 are scattered. Furthermore, both the first polarization component and the second polarization component of the light sequentially transmitted through the area A13, the area A33, and the area A23 of the light control device 200 are also scattered similarly.

The scattering efficiency can be thereby improved.

Second Configuration Example

Figure 9:
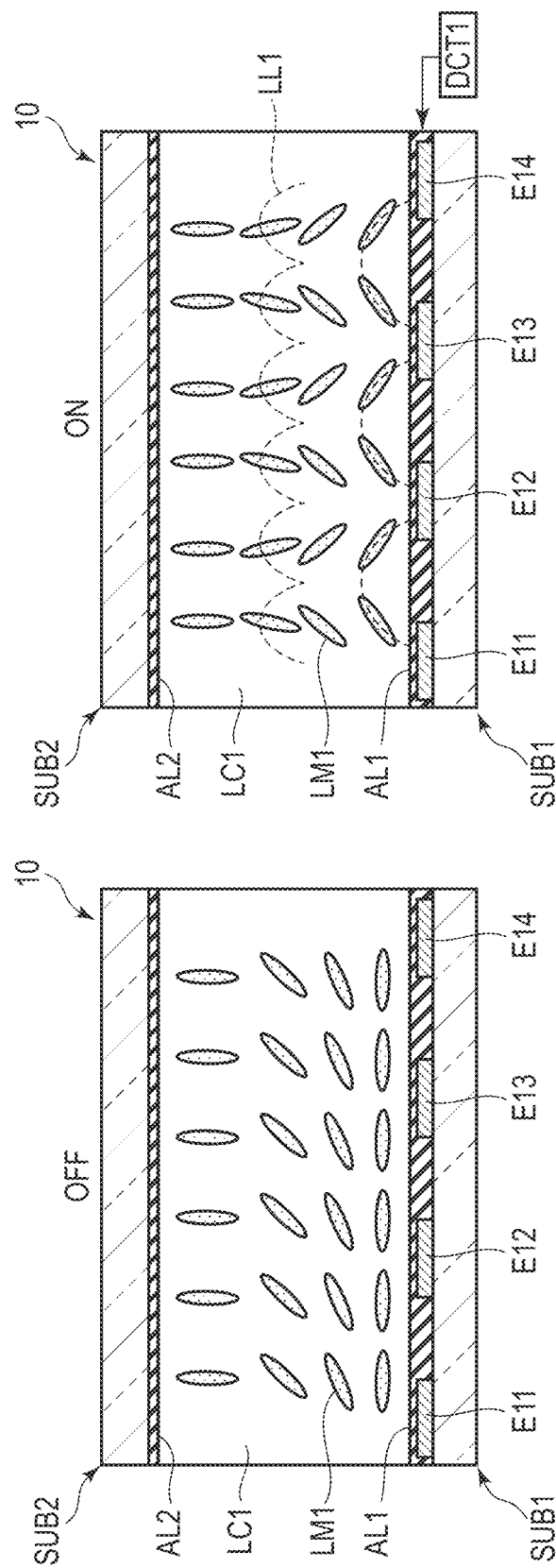
FIG. 9A is a view illustrating the other configuration example of the first liquid crystal cell 10.
FIG. 9B is a view illustrating the other configuration example of the first liquid crystal cell 10.

FIG. 9 is a view illustrating the other configuration example of the first liquid crystal cell 10. Only the configuration necessary for description is illustrated in FIG. 9. The first alignment film AL1 is a horizontal alignment film, and the second alignment film AL2 is a vertical alignment film. The first alignment film AL1 is subjected to alignment treatment in a predetermined direction. The first liquid crystal layer LC1 is, for example, a positive type and contains the liquid crystal molecules LM1. The first liquid crystal layer LC1 may be a negative type.

FIG. 9A shows an off-state (OFF), and a potential difference is not formed between the adjacent first electrodes. The liquid crystal molecules LM1 near the first alignment film AL1 which is the horizontal alignment film are aligned substantially horizontally along the surface of the first alignment film ALL The liquid crystal molecules LM1 near the second alignment film AL2 which is the vertical alignment film are aligned substantially vertically to the surface of the second alignment film AL2. Initial alignment of the liquid crystal molecules LM1 is referred to as hybrid alignment.

FIG. 9B shows an on-state (ON). The voltage controller DCT1 supplies a predetermined voltage to each of the first electrodes E11 to E14 such that a potential difference is formed between the adjacent first electrodes. Electric fields substantially parallel to the main surface (X-Y plane) of the first substrate SUB1 are formed between the first electrodes E11 and E12, between the first electrodes E12 and E13, and between the first electrodes E13 and E14. Since the first liquid crystal layer LC1 is a positive type, the liquid crystal molecules LM1 near the first alignment film AL1 are aligned such that their long axes extend along the electric fields in a state in which the electric fields represented by a dotted line in the figure are formed. Such a refractive index distribution or a retardation distribution corresponding to the aligned state of the liquid crystal molecules LM1 forms the liquid crystal lens LL1.

In the second liquid crystal cell 20, too, the third alignment film AL3 is a horizontal alignment film, the fourth alignment film AL4 is a vertical alignment film, and the second liquid crystal layer LC2 is a positive type. In the second liquid crystal cell 20, too, a liquid crystal lens similar to the liquid crystal lens LL1 described with reference to FIG. 9B can be formed in the on-state.

Figure 10:
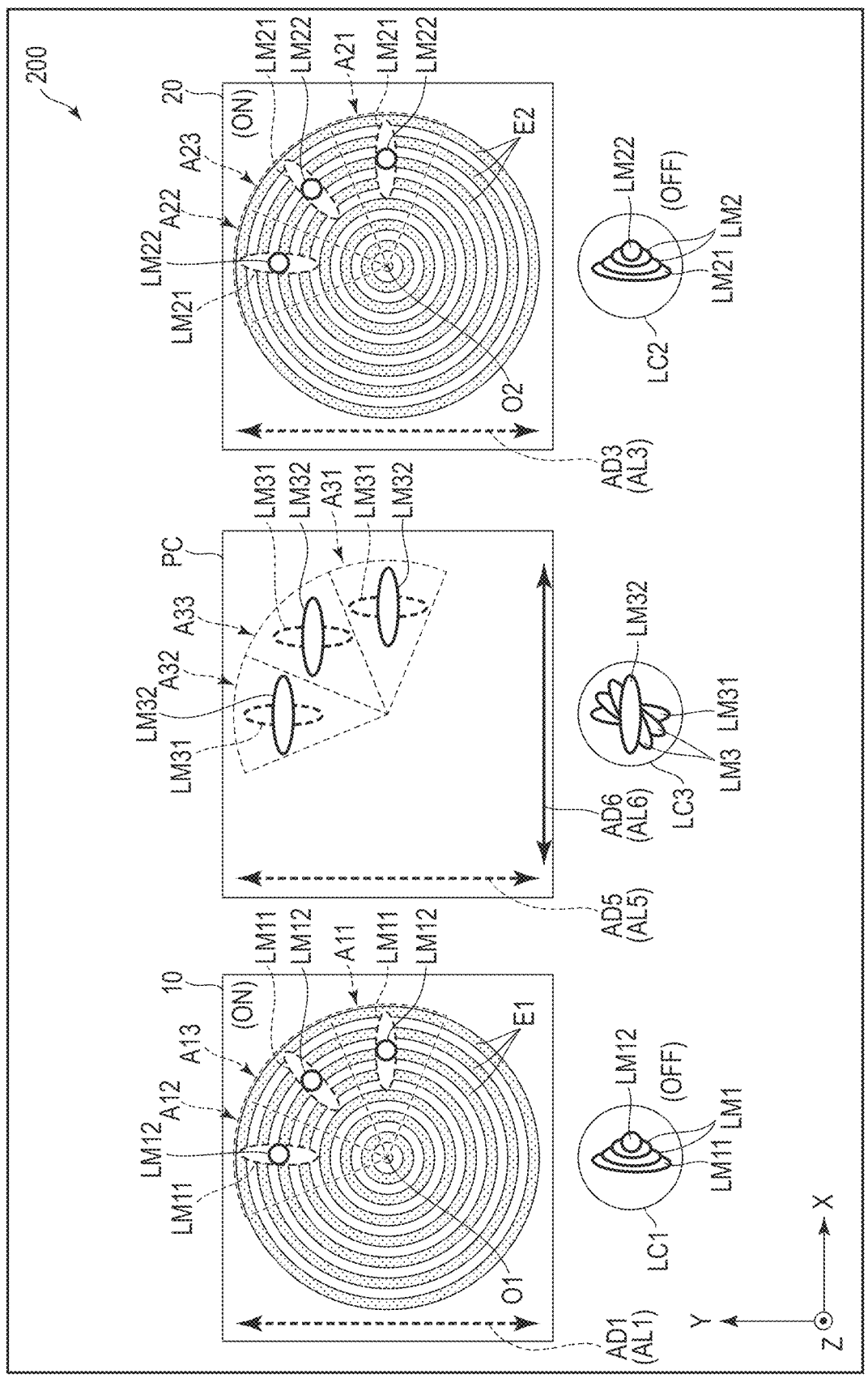
FIG. 10 is a view showing a second configuration example of the light control device 200.

FIG. 10 is a view showing a second configuration example of the light control device 200. The second configuration example shown in FIG. 10 is different from the first configuration example shown in FIG. 8 in configurations of the first liquid crystal cell 10 and the second liquid crystal cell 20.

In the first liquid crystal cell 10, the alignment treatment direction AD1 of the first alignment film AL1 which is a horizontal alignment film is parallel to the second direction Y, and the second alignment film AL2 is a vertical alignment film. In the off-state, the liquid crystal molecules LM1 are subjected to hybrid alignment between the first alignment film AL1 and the second alignment film AL2. Among the liquid crystal molecules LM1, the liquid crystal molecule LM11 near the first alignment film AL1 is aligned along the second direction Y, and the liquid crystal molecule LM12 near the second alignment film AL2 is vertically aligned. The alignment treatment direction AD1 may be a direction different from the second direction Y on the X-Y plane.

In the second liquid crystal cell 20, the alignment treatment direction AD3 of the third alignment film AL3 which is a horizontal alignment film is parallel to the second direction Y, and the fourth alignment film AL4 is a vertical alignment film. In the off-state, the liquid crystal molecules LM2 are subjected to hybrid alignment between the third alignment film AL3 and the fourth alignment film AL4. Among the liquid crystal molecules LM2, the liquid crystal molecule LM21 near the third alignment film AL3 is aligned along the second direction Y, and the liquid crystal molecule LM22 near the fourth alignment film AL4 is vertically aligned. The alignment treatment direction AD3 may be a direction different from the second direction Y on the X-Y plane, but is parallel to the alignment treatment direction AD1.

Similarly to the first configuration example, the first liquid crystal cell 10 includes the areas A11 to A13, the second liquid crystal cell 20 includes the areas A21 to A23, and the polarization conversion element PC includes the areas A31 to A33. When the first liquid crystal cell 10, the polarization conversion element PC, and the second liquid crystal cell 20 are stacked in order, the area A31 is located between the areas A11 and A21, the area A32 is located between the areas A12 and A22, and the area A33 is located between the areas A13 and A23.

In the first liquid crystal cell 10 in the on-state, the liquid crystal molecule LM11 is aligned in the first direction X under an influence from the electric field, in the area A11. In the area A11, the first polarization component of the incident light is scattered, and the second polarization component of the incident light is hardly scattered and is transmitted.

In the area A12, the liquid crystal molecule LM11 is aligned in the second direction Y under an influence from the electric field. In the area A12, the first polarization component of the incident light is hardly scattered and is transmitted, and the second polarization component of the incident light is scattered.

In the polarization conversion element PC, the second polarization component of the incident light which is the transmitted light of the area A11, is converted into the first polarization component, in the area A31. In addition, in the area A31, the first polarization component scattered in the area A11 is converted into the second polarization component.

In the area A32, the first polarization component of the incident light which is the transmitted light of the area A12 is converted into the second polarization component. In addition, in the area A32, the second polarization component scattered in the area A12 is converted into the first polarization component.

In the second liquid crystal cell 20 in the on-state, the liquid crystal molecule LM21 is aligned in the first direction X under an influence from the electric field, in the area A21. In the area A21, the first polarization component of the incident light which is the transmitted light of the area A31 is scattered, and the second polarization component of the incident light is hardly scattered and is transmitted.

In the area A22, the liquid crystal molecule LM21 is aligned in the second direction Y under an influence from the electric field. In the area A22, the first polarization component of the incident light which is the transmitted light of the area A32 is hardly scattered and is transmitted, and the second polarization component of the incident light is scattered.

According to the second configuration example, the scattering efficiency can be improved similarly to the above-described first configuration example.

Third Configuration Example

Figure 11:
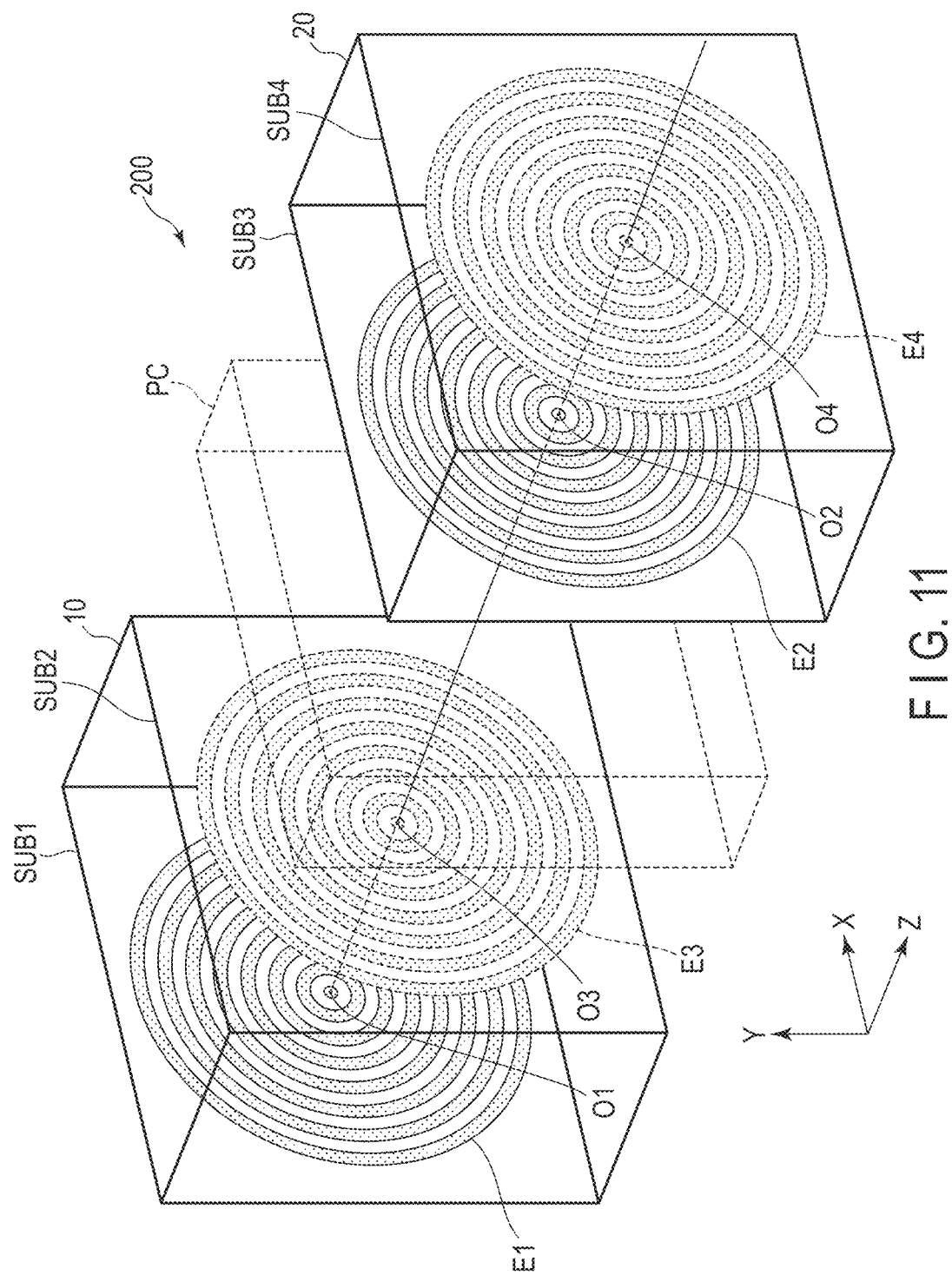
FIG. 11 is an exploded perspective view showing a third configuration example of the light control device 200.

FIG. 11 is an exploded perspective view showing a third configuration example of the light control device 200. In FIG. 11, only main parts are illustrated.

In the first liquid crystal cell 10, the first substrate SUB1 comprises a plurality of first electrodes E1 disposed concentrically, and the second substrate SUB2 comprises a plurality of third electrodes E3 disposed concentrically. In the first liquid crystal cell 10, the first substrate SUB1 and the second substrate SUB2 are disposed such that the first electrodes E1 and the third electrodes E3 overlap.

In the second liquid crystal cell 20, the third substrate SUB3 comprises a plurality of second electrodes E2 disposed concentrically, and the fourth substrate SUB4 comprises a plurality of fourth electrodes E4 disposed concentrically. In the second liquid crystal cell 20, the third substrate SUB3 and the fourth substrate SUB4 are disposed such that the second electrodes E2 and the fourth electrodes E4 overlap.

For example, each of the first electrodes E1, the second electrodes E2, the third electrodes E3, and the fourth electrodes E4 is equal in the diameter, the width, the pitch, and the number of electrodes. In addition, the center O1 of the first electrodes E1, the center O2 of the second electrodes E2, the center O3 of the third electrodes E3, and the center O4 of the fourth electrodes E4 overlap in planar view of the X-Y plane. In other words, the first electrodes E1, the second electrodes E2, the third electrodes E3, and the fourth electrodes E4 are formed such that their centers correspond to each other in the X-Y plane.

Figure 12:
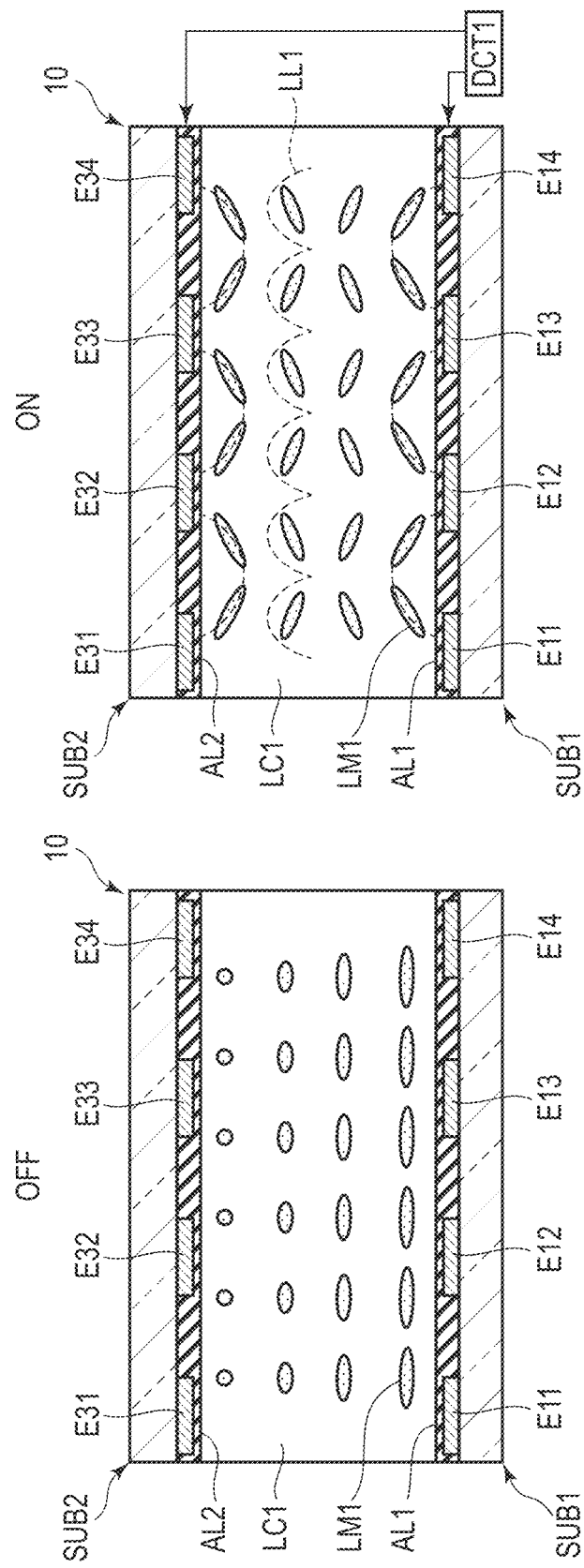
FIG. 12A is a view illustrating the other configuration example of the first liquid crystal cell 10.
FIG. 12B is a view illustrating the other configuration example of the first liquid crystal cell 10.

FIG. 12 is a view illustrating yet another configuration example of the first liquid crystal cell 10. Only the configuration necessary for description is illustrated in FIG. 12. The first alignment film AL1 covers the first electrodes E11 to E14, and the second alignment film AL2 covers third electrodes E31 to E34. The first alignment film AL1 and the second alignment film AL2 are horizontal alignment films. The alignment treatment direction of the first alignment film AL1 intersects the alignment treatment direction of the second alignment film AL2. The first liquid crystal layer LC1 is, for example, a positive type and contains the liquid crystal molecules LM1.

FIG. 12A shows an off-state (OFF), and a potential difference is not formed between the adjacent first electrodes or a potential difference is not formed between the adjacent second electrodes either. The liquid crystal molecules LM1 are twist-aligned between the first alignment film AL1 and the second alignment film AL2, by the alignment restriction force of the first alignment film AL1 and the second alignment film AL2.

FIG. 12B shows an on-state (ON). The voltage controller DCT1 supplies a predetermined voltage to each of the first electrodes E11 to E14 such that a potential difference is formed between the adjacent first electrodes. In addition, the voltage controller DCT1 supplies a predetermined voltage to each of the third electrodes E31 to E34 such that a potential difference is formed between the adjacent third electrodes.

Electric fields substantially parallel to the main surface of the first substrate SUB1 are formed between the first electrodes E11 and E12, between the first electrodes E12 and E13, and between the first electrodes E13 and E14, in the vicinity of the first alignment film AL1. Electric fields substantially parallel to the main surface of the second substrate SUB2 are formed between the third electrodes E31 and E32, between the third electrodes E32 and E33, and between the third electrodes E33 and E34, in the vicinity of the second alignment film AL2. Since the first liquid crystal layer LC1 is a positive type, the liquid crystal molecules LM1 near the first alignment film AL1 and the liquid crystal molecules LM1 near the second alignment film AL2 are aligned such that their long axes extend along the electric fields in a state in which the electric fields represented by a dotted line in the figure are formed. Such a refractive index distribution or a retardation distribution corresponding to the aligned state of the liquid crystal molecules LM1 forms the liquid crystal lens LL1.

In the second liquid crystal cell 20, too, the third alignment film AL3 and the fourth alignment film AL4 are horizontal alignment films, and the second liquid crystal layer LC2 is a positive type. In the second liquid crystal cell 20, too, a liquid crystal lens similar to the liquid crystal lens LL1 described with reference to FIG. 12B can be formed in the on-state.

Figure 13:
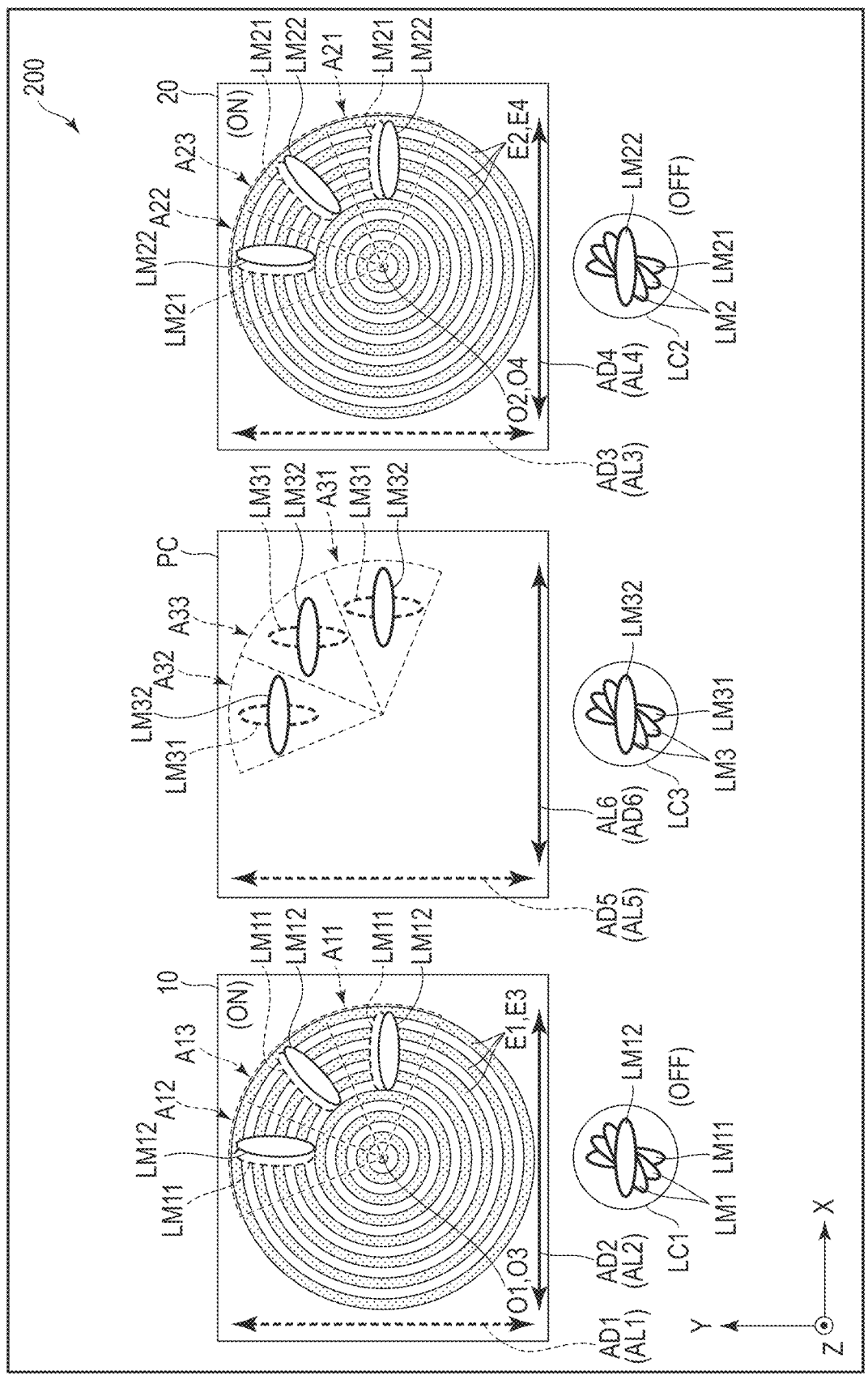
FIG. 13 is a view showing a third configuration example of the light control device 200.

FIG. 13 is a view showing a third configuration example of the light control device 200. The second configuration example shown in FIG. 13 is different from the first configuration example shown in FIG. 8 in configurations of the first liquid crystal cell 10 and the second liquid crystal cell 20.

In the first liquid crystal cell 10, the alignment treatment direction AD1 of the first alignment film AL1 is parallel to the second direction Y, and the alignment treatment direction AD2 of the second alignment film AL2 is parallel to the first direction X. In other words, the alignment treatment direction AD1 is orthogonal to the alignment treatment direction AD2. In the off-state, the liquid crystal molecules LM1 are twist-aligned at 90 degrees between the first alignment film AL1 and the second alignment film AL2. Among the liquid crystal molecules LM1, the liquid crystal molecule LM11 near the first alignment film AL1 is aligned along the second direction Y, the liquid crystal molecule LM12 near the second alignment film AL2 is aligned along the first direction X, and the plurality of liquid crystal molecules LM1 located in the intermediate layer are twist-aligned.

In the second liquid crystal cell 20, the alignment treatment direction AD3 of the third alignment film AL3 is parallel to the second direction Y, and the alignment treatment direction AD4 of the fourth alignment film AL4 is parallel to the first direction X. In other words, the alignment treatment direction AD3 is orthogonal to the alignment treatment direction AD4. In the off-state, the liquid crystal molecules LM2 are twist-aligned at 90 degrees between the third alignment film AL3 and the fourth alignment film AL4. Among the liquid crystal molecules LM2, the liquid crystal molecule LM21 near the third alignment film AL3 is aligned along the second direction Y, the liquid crystal molecule LM22 near the fourth alignment film AL4 is aligned along the first direction X, and the plurality of liquid crystal molecules LM2 located in the intermediate layer are twist-aligned.

Similarly to the first configuration example, the first liquid crystal cell 10 includes the areas A11 to A13, the second liquid crystal cell 20 includes the areas A21 to A23, and the polarization conversion element PC includes the areas A31 to A33. When the first liquid crystal cell 10, the polarization conversion element PC, and the second liquid crystal cell 20 are stacked in order, the area A31 is located between the areas A11 and A21, the area A32 is located between the areas A12 and A22, and the area A33 is located between the areas A13 and A23.

In the first liquid crystal cell 10 in the on-state, the liquid crystal molecule LM11 in the area A11 is aligned in the first direction X, mainly under an influence from the electric field of the first electrode E1. In addition, the liquid crystal molecule LM12 in the area A11 is aligned in the first direction X, mainly under an influence from an electric field of the third electrode E3. In other words, the alignment directions of the liquid crystal molecules LM11 and LM12 are substantially parallel to each other, in the on-state. In the area A11, the first polarization component of the incident light is scattered, and the second polarization component of the incident light is hardly scattered and is transmitted.

The liquid crystal molecule LM11 in the area A12 is aligned in the second direction Y, mainly under the influence from the electric field of the first electrode E1. In addition, the liquid crystal molecule LM12 in the area A12 is aligned in the second direction Y, mainly under the influence from the electric field of the third electrode E3. In the area A12, the first polarization component of the incident light is hardly scattered and is transmitted, and the second polarization component of the incident light is scattered.

In the polarization conversion element PC, the second polarization component of the incident light which is the transmitted light of the area A11, is converted into the first polarization component, in the area A31. In addition, in the area A31, the first polarization component scattered in the area A11 is converted into the second polarization component.

In the area A32, the first polarization component of the incident light which is the transmitted light of the area A12 is converted into the second polarization component. In addition, in the area A32, the second polarization component scattered in the area A12 is converted into the first polarization component.

In the second liquid crystal cell 20 in the on-state, the liquid crystal molecule LM21 in the area A21 is aligned in the first direction X, mainly under the influence from the electric field of the second electrode E2. In addition, the liquid crystal molecule LM22 in the area A21 is aligned in the first direction X, mainly under an influence from an electric field of the fourth electrode E4. In the area A21, the first polarization component of the incident light which is the transmitted light of the area A31 is scattered, and the second polarization component of the incident light is hardly scattered and is transmitted.

The liquid crystal molecule LM21 in the area A22 is aligned in the second direction Y, mainly under the influence from the electric field of the second electrode E2. In addition, the liquid crystal molecule LM22 in the area A22 is aligned in the second direction Y, mainly under the influence from the electric field of the fourth electrode E4. In the area A22, the first polarization component of the incident light which is the transmitted light of the area A32 is hardly scattered and is transmitted, and the second polarization component of the incident light is scattered.

According to the third configuration example, the scattering efficiency can be improved similarly to the above-described first configuration example.

It has been described that the first liquid crystal cell 10 and the second liquid crystal cell 20 are twisted nematic liquid crystal elements in the third configuration example, but the liquid crystal cells are not limited to those. For example, each of the first liquid crystal layer LC1 and the second liquid crystal layer LC2 may contain vertically aligned liquid crystal molecules similarly to the first configuration example, hybrid-aligned liquid crystal molecules similarly to the second configuration example, or horizontally aligned liquid crystal molecules.

It has been described that in each of the above-described configuration examples, the polarization conversion element PC is a twisted nematic liquid crystal element comprising no electrodes, but the polarization conversion element PC is not limited to this. In other words, the polarization conversion element PC may be the other element comprising a function of converting the first polarization component of the incident light into the second polarization component and converting the second polarization component of the incident light into the first polarization component.

As described above, according to the embodiments, the light control device and the illumination device capable of improving the scattering efficiency can be provided.

The present invention is not limited to the embodiments described above but the constituent elements of the invention can be modified in various manners without departing from the spirit and scope of the invention. Various aspects of the invention can also be extracted from any appropriate combination of constituent elements disclosed in the embodiments. Some constituent elements may be deleted in all of the constituent elements disclosed in the embodiments. The constituent elements described in different embodiments may be combined arbitrarily.

What is claimed is:

1. A light control device comprising:
   a first liquid crystal cell comprising a first substrate, a second substrate opposed to the first substrate, and a first liquid crystal layer held between the first substrate and the second substrate, the first substrate comprising a plurality of first electrodes disposed concentrically;
   a second liquid crystal cell comprising a third substrate, a fourth substrate opposed to the third substrate, and a second liquid crystal layer held between the third substrate and the fourth substrate, the third substrate comprising a plurality of second electrodes disposed concentrically; and
   a polarization conversion element disposed between the first liquid crystal cell and the second liquid crystal cell,
   wherein each of the first liquid crystal layer and the second liquid crystal layer includes:
   a first area where a first polarization component having a first polarization plane along a first direction, of incident light, is scattered, and a second polarization component having a second polarization plane along a second direction intersecting the first direction, of incident light, is transmitted; and
   a second area where the first polarization component of the incident light is transmitted and the second polarization component of the incident light is scattered, and
   the polarization conversion element PC overlaps the first area and the second area, and is configured to convert the first polarization component of the incident light into the second polarization component, and to convert the second polarization component of the incident light into the first polarization component.

2. The light control device of claim 1, wherein
   a center of the first electrode and a center of the second electrode overlap in planar view.

3. The light control device of claim 1, wherein
   the first substrate comprises a first alignment film covering the plurality of first electrodes,
   the second substrate comprises a second alignment film,
   the third substrate comprises a third alignment film covering the plurality of second electrodes,
   the fourth substrate comprises a fourth alignment film, and
   the first to fourth alignment films are vertical alignment films.

4. The light control device of claim 1, wherein
   the first substrate comprises a first alignment film covering the plurality of first electrodes,
   the second substrate comprises a second alignment film,
   the third substrate comprises a third alignment film covering the plurality of second electrodes,
   the fourth substrate comprises a fourth alignment film,
   the first alignment film and the third alignment film are horizontal alignment films,
   an alignment treatment direction of the first alignment film and an alignment treatment direction of the third alignment film are parallel to each other, and
   the second alignment film and the fourth alignment film are vertical alignment films.

5. The light control device of claim 1, wherein
   the second substrate comprises a plurality of third electrodes disposed concentrically,
   the fourth substrate comprises a plurality of fourth electrodes disposed concentrically, and
   a center of the first electrode, a center of the second electrode, a center of the third electrode, and
   a center of the fourth electrode overlap in planar view.

6. The light control device of claim 1, wherein
   the polarization conversion element comprises a fifth substrate comprising a fifth alignment film, a sixth substrate comprising a sixth alignment film, and a third liquid crystal layer held between the fifth substrate and the sixth substrate, the fifth alignment film and the sixth alignment film are horizontal alignment films, an alignment treatment directions of the fifth alignment film and an alignment treatment directions of the sixth alignment film intersect each other, and the third liquid crystal layer contains twist-aligned liquid crystal molecules.

7. A light control device comprising:

a first liquid crystal cell comprising a first substrate comprising a plurality of first electrodes disposed concentrically and a first alignment film covering the plurality of first electrodes, a second substrate comprising a second alignment film, and a first liquid crystal layer held between the first substrate and the second substrate;

a second liquid crystal cell comprising a third substrate comprising a plurality of second electrodes disposed concentrically and a third alignment film covering the plurality of second electrodes, a fourth substrate comprising a fourth alignment film, and a second liquid crystal layer held between the third substrate and the fourth substrate; and a polarization conversion element comprising a fifth substrate comprising a fifth alignment film, a sixth substrate comprising a sixth alignment film, and a third liquid crystal layer held between the fifth substrate and the sixth substrate, wherein the first to fourth alignment films are vertical alignment films, the polarization conversion element is disposed between the first liquid crystal cell and the second liquid crystal cell, the fifth alignment film and the sixth alignment film are horizontal alignment films, an alignment treatment directions of the fifth alignment film and an alignment treatment directions of the sixth alignment film intersect each other, and the third liquid crystal layer contains twist-aligned liquid crystal molecules.

8. A light control device comprising:

a first liquid crystal cell comprising a first substrate comprising a plurality of first electrodes disposed concentrically and a first alignment film covering the plurality of first electrodes, a second substrate comprising a second alignment film, and a first liquid crystal layer held between the first substrate and the second substrate;

a second liquid crystal cell comprising a third substrate comprising a plurality of second electrodes disposed concentrically and a third alignment film covering the plurality of second electrodes, a fourth substrate comprising a fourth alignment film, and a second liquid crystal layer held between the third substrate and the fourth substrate; and a polarization conversion element comprising a fifth substrate comprising a fifth alignment film, a sixth substrate comprising a sixth alignment film, and a third liquid crystal layer held between the fifth substrate and the sixth substrate, wherein the first alignment film and the third alignment film are horizontal alignment films, an alignment treatment directions of the first alignment film and an alignment treatment directions of the third alignment film are parallel to each other, the second alignment film and the fourth alignment film are vertical alignment films, the polarization conversion element is disposed between the first liquid crystal cell and the second liquid crystal cell, the fifth alignment film and the sixth alignment film are horizontal alignment films, an alignment treatment directions of the fifth alignment film and an alignment treatment directions of the sixth alignment film intersect each other, and the third liquid crystal layer contains twist-aligned liquid crystal molecules.

9. A light control device comprising:

a first liquid crystal cell comprising a first substrate comprising a plurality of first electrodes disposed concentrically and a first alignment film covering the plurality of first electrodes, a second substrate comprising a plurality of third electrodes disposed concentrically and a second alignment film covering the plurality of third electrodes, and a first liquid crystal layer held between the first substrate and the second substrate;

a second liquid crystal cell comprising a third substrate comprising a plurality of second electrodes disposed concentrically and a third alignment film covering the plurality of second electrodes, a fourth substrate comprising a plurality of fourth electrodes disposed concentrically and a fourth alignment film covering the plurality of fourth electrodes, and a second liquid crystal layer held between the third substrate and the fourth substrate; and a polarization conversion element comprising a fifth substrate comprising a fifth alignment film, a sixth substrate comprising a sixth alignment film, and a third liquid crystal layer held between the fifth substrate and the sixth substrate, wherein a center of the first electrode, a center of the second electrode, a center of the third electrode, and a center of the fourth electrode overlap in planar view, the polarization conversion element is disposed between the first liquid crystal cell and the second liquid crystal cell, the fifth alignment film and the sixth alignment film are horizontal alignment films, an alignment treatment directions of the fifth alignment film and an alignment treatment directions of the sixth alignment film intersect each other, and the third liquid crystal layer contains twist-aligned liquid crystal molecules.

10. An illumination device comprising:

a light source; and the light control device of claim 1 configured to control light emitted from the light source.

* * * * *